March 5, 1957   J. HALTENBERGER   2,783,826
AUTOMOBILE FRONT SEAT BACKREST CONTROL
Filed July 6, 1954   2 Sheets-Sheet 1
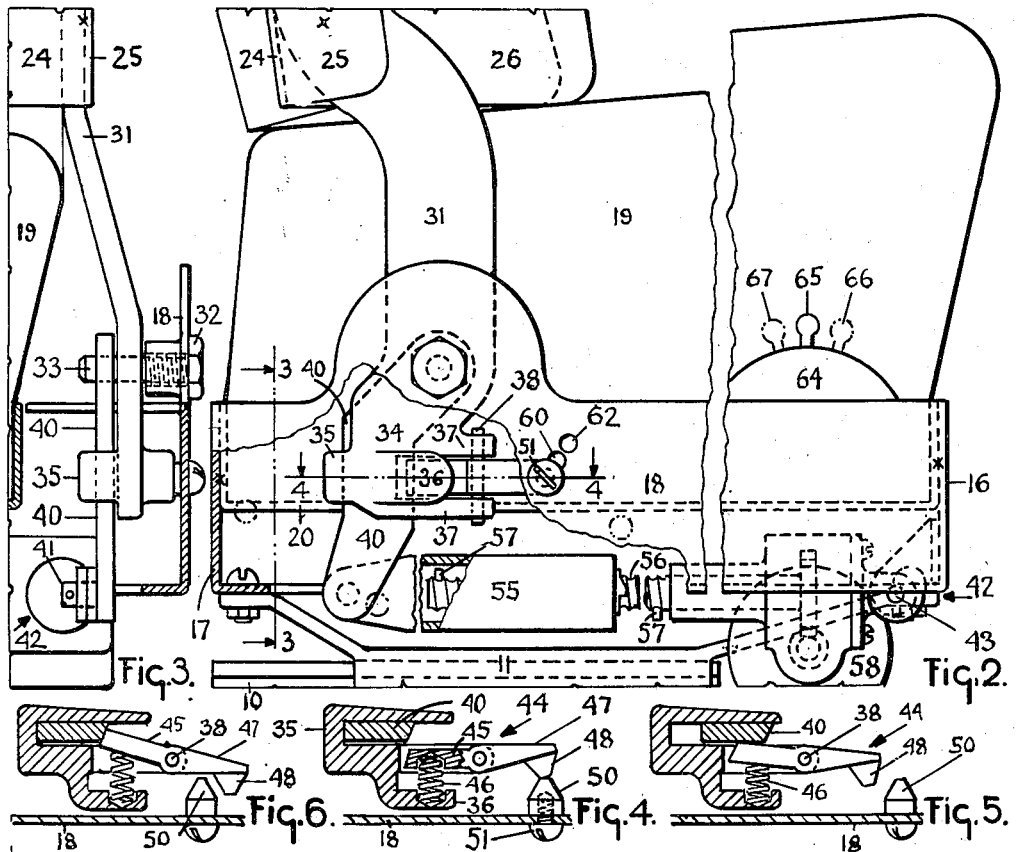
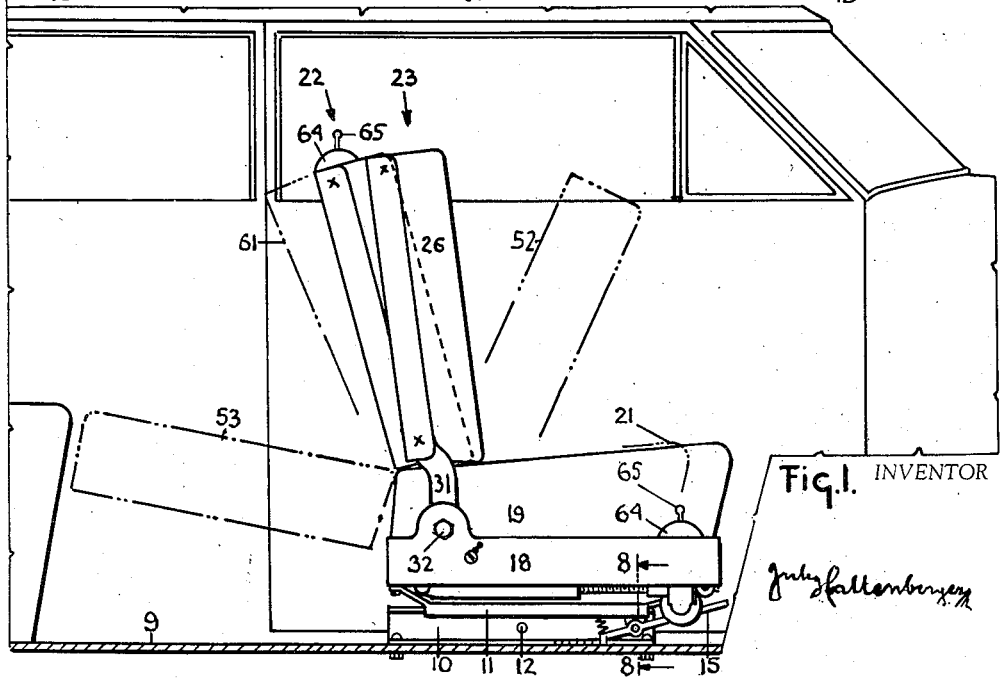
INVENTOR March 5, 1957 J. HALTENBERGER 2,783,826
AUTOMOBILE FRONT SEAT BACKREST CONTROL
Filed July 6, 1954 2 Sheets-Sheet 2

INVENTOR
Jules Haltenberger

United States Patent Office 2,783,826
Patented Mar. 5, 1957

2,783,826

AUTOMOBILE FRONT SEAT BACKREST CONTROL

Jules Haltenberger, Rancho Santa Fe, Calif.

Application July 6, 1954, Serial No. 441,352

6 Claims. (Cl. 155—163)

The present invention pertains to automobile front seat backrest control, and in part relates to my co-pending application Ser. No. 395,210, filed November 30, 1953, for Automobile Front Seat Independent Adjustment.

About half of the automobiles now produced provide only two-door bodies; therefore, for rear seat passenger ingress, the front seat backrest has to be tilted forwardly.

Many automobile passenger front seat backrests are now also rearwardly adjustable for passenger comfort and for sleeping. The constructions that applicant is aware of are crude and locate the passenger backrest in only a few widely separated positions. These backrest position locations are difficult to operate, and they do not lock the backrest in any desired position; therefore, in case of power brake application or collision the backrest mass energy and/or the rear passengers throw the front seat passenger forwardly.

It was proposed to lock the front seat backrest in its normal position.

It is here proposed and is the object of my invention to operate the front seat backrest with a reversible electric motor, preferably with one electric control accessible to the passenger from the body interior or exterior (with opened front door), and by additional control accessible by the driver or any of the rear seat passengers.

A further object is to lock the backrest in any desired position to reduce quick deceleration damage, while providing a predetermined backrest position, where the backrest is manually directly movable forwardly, and preferably, to provide an adjustable predetermined position.

Figure 7:
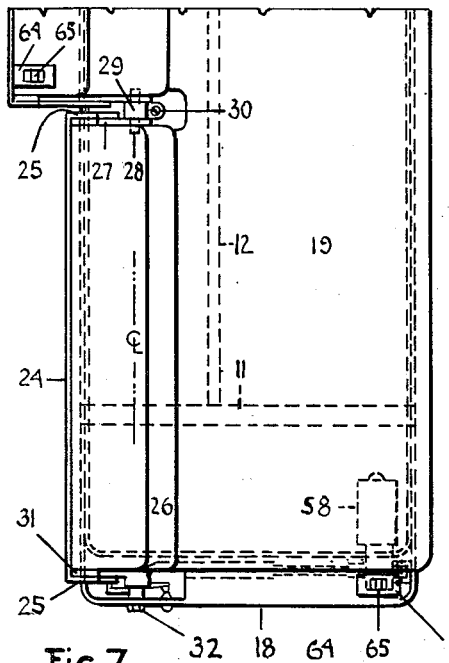
Figure 10:
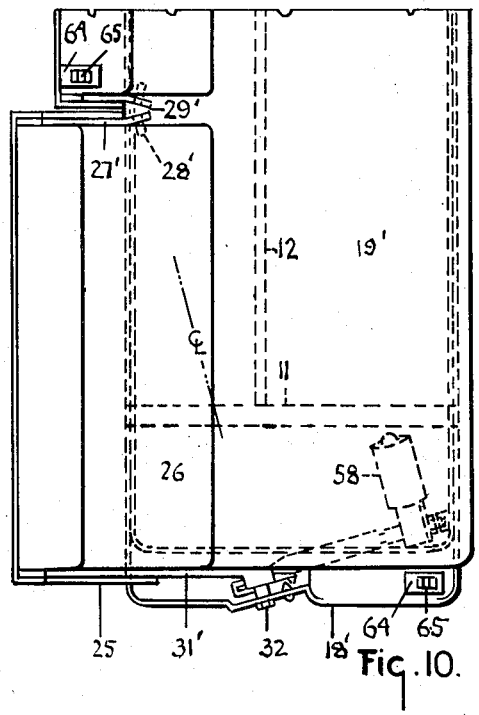
Figure 9:
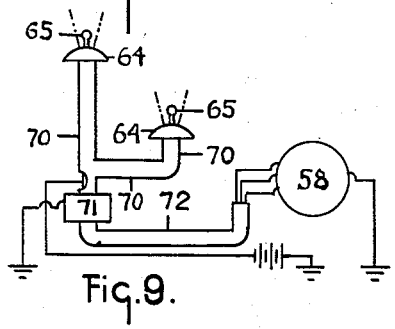
Figure 8:
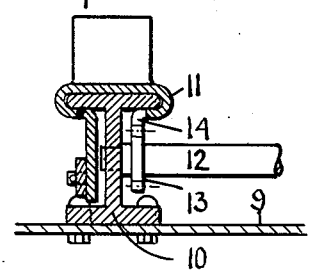
Figure 11:
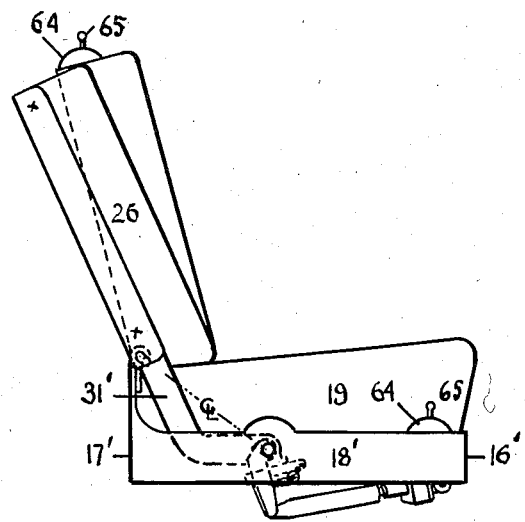

Referring to the drawings: Fig. 1 is a side elevation of the interior of a part of a usual two-door automobile, illustrating the driver and passenger backrests when operating on an axis that is perpendicular to the longitudinal axis of the automobile, and will be referred to as parallel tiltable backrests; Fig. 2 is a fragmental side elevation of a part of the front seat shown in Fig. 1, here illustrated in a larger scale; Fig. 3 is a section substantially on line 3—3 of Fig. 2; Fig. 4 is a section substantially on line 4—4 of Fig. 2, illustrating the backrest predetermined position released lock for backrest direct manual forward movement; Fig. 5 illustrates the lock shown in Fig. 4, when the seat backrest is moved manually forwardly; Fig. 6 illustrates the lock shown in Fig. 4, when in locked position for the electric motor controlled operation; Fig. 7 illustrates the plan elevation of the automobile front seat shown in Fig. 1; Fig. 8 is a section substantially on line 8—8 of Fig. 1, here shown in a larger scale; Fig. 9 is a schematic presentation of a part of the electrical control elements; Fig. 10 is a plan elevation of an automobile front seat, where the driver's backrest is indicated to be in its "normal" position, and the passenger's obliquely hinged backrest is tilted slightly to the rear thereof, and where some of the parts are only schematically illustrated; Fig. 11 is an end elevation of Fig. 10.

Referring to Figs. 1 to 9 inclusive it will be seen that to a usual automobile body floor 9 is secured an H section element 10 to provide a usual front seat fore and aft adjustment as by a free sliding shoe 11 secured to the seat base or frame in the usual manner. Two spaced H elements and shoes are provided, and they, for parallel unbinding action, are operatively interconnected by a shaft 12 having a pinion 13 engaged to rack 14. The desired seat fore and aft position is thereafter locked by releasable lever 15, all in the usual well known manner.

The seat base is a frame having a front wall 16, rear wall 17, and interconnecting end walls 18. The seat is provided with a seat cushion 19 arranged to be supported by a seat tray having a bottom wall 20, and is preferably spot welded to the frame. Dot and dash line 21 indicates the seat aft adjusted position.

The driver's backrest, generally at 22, is shown in its "normal" position. The passenger's backrest, generally at 23, in solid lines is shown in manually tiltable position. The passenger's backrest is formed of a large plate 24, having forward turned lips 25 at each end, and it is provided with a backrest cushion 26. In between the cushion ends and lips, backrest supporting arms spotweld held to the lips, are provided. The inner arm 27 is arranged to hinge on pin 28 protruding from bracket 29 which is secured to the tray bottom top surface by screw 30.

The outer arm 31 of the backrest is hinged on a cap screw 32, having a hinge pin portion 33 and is held by a boss on wall 18. Below the hinge center, the arm has a main extension 34, a rear U lip 35, an outwardly extending spring anchoring boss 36, and a pair of forwardly extending lock hinge arms 37, carrying a lock hinge pin 38.

This releasably operating structure includes a hinged linked element 40 fulcrumed at its upper end operating portion on pin 33, and its lower portion, as by pin 41, is operatively engaged to the rear operating end of a reversible electric motor operated power jack generally at 42. The front end thereof is operatively fulcrumed by pin 43.

Link 40 intermediate to its ends and substantially at its mid-portion is in three directions surrounded by the U lip, a part of the arm. Latch hinge pin 38 operatively supports a latch, generally at 44, that moves in unison with the backrest tilting, and having a latching element extension 45, which is constantly urged inwardly by spring 46. The latch has a forwardly extending release arm 47 having a cam 48. As shown in Fig. 4, wall 18 supports a stationary control cam 50, secured by screw 51. In the position illustrated in Figs. 1 to 4 inclusive, the latch does not engage the link; therefore, the seat backrest can be tilted manually forwardly. Fig. 5 illustrates the latch details when the seat backrest is tilted forwardly (from the position shown in Figs. 1 to 4 inclusive) to the position 52, shown by dot and dash lines in Fig. 1.

When either of the power jack control levers are moved rearwardly (to be described) to move the passenger's backrest to align with the driver's backrest to reach its "normal" position, then the latch locks the link to the arm, they will be in position as illustrated in Fig. 6. When this power operation continues and the passenger's backrest reaches the bed position indicated by dot and dash lines 53, the arm and link remain locked together as shown in Fig. 6, except that in between cams 48 and 50 there will be a longer separating gap.

The powerjack 42 was described in detail in my aforementioned patent application and it is now well known. It includes a sleeve 55, at one end operatively connected by pin 41 to the lower end of link 40. The other end includes a ball bearing operated nut rolling in thread groove 56, having jack extension and contaction motion limiting pins 57, and is arranged to be operated by a reversible electric motor 58.

As illustrated in Figs. 1 to 4 inclusive, the passenger's backrest is manually tiltable forwardly when in the position shown in solid lines. When the automobile owner desires the passenger's backrest to be manually tiltable, from "normal" position (aligned with the driver's seat) then by removing the release operating cam 50 and securing same by screw 51 through hole 60, it will be accomplished. Whereas applicant prefers that the passenger's backrest be manually forwardly tiltable only from the position illustrated in solid lines, some automobile owners might prefer that the backrest be manually tiltable when it is to the rear (dot and dash lines 61) of its "normal" position. This is accomplished by securing the cam through hole 62.

At the passenger's side the seat edge is provided with a well known three position electrical switch in housing 64. It is conveniently accessible to the passenger when seated or lying down, and also accessible from the outside of the automobile when the respective front door is open. This switch operating lever has a vertical neutral position 65, backrest forwardly tilting operating position 66, and backrest rearward tilt operating position 67.

A duplicate three position switch is mounted on the driver's backrest top adjacent to the passenger's backrest. In this location it is conveniently accessible to the driver, the rear seat passengers and also the passenger when lying down.

Dual switch control of a reversible electric motor is well known, and it is believed that showing some of the elements in Fig. 9 will suffice. Here the switch housings are provided with electric wires protecting conduits 70 leading to a well known relay box 71. Therefrom conduit 72 leads to the reversible motor.

Applicant here presents a desired seat backrest control that provides for very fine position adjustments so desired on long rides, and locks the seat backrest to prevent quick decelleration damage, permits backrest adjustments without leaving the comfort of the sitting position, and selectively provides an adjustable predetermined manually operable backrest tilting position for when the power control is not desired.

Here and in the preferred form applicant provides on the passenger's diagonal axis hinged backrest an extreme position rearward to the "normal," and from this position the electric motor operated jack moves the seat forwardly and back. This application also includes seat backrest released positions and adjustments thereof, as described in connection with Figs. 1 to 9 inclusive.

In preferred form the powerjack seat backrest control is applied on the passenger backrest, but is equally applicable to the driver's seat when so desired.

In Figs. 1 to 8 inclusive, applicant illustrates a seat construction, where the passenger's backrest is tiltable in parallel planes by power means and in a wide range thereof, and is manually forwardly tiltable from one (adjustable) predetermined position—when so desired.

This invention is not limited to passenger's seat backrest parallel tilting only, it is also applicable to obliquely hinged seat backrests, this is illustrated in Figs. 10 and 11. Here, the backrest position controls substantially duplicate the controls shown and described in connection with Figs. 1 to 8 inclusive. For simplicity of presentation the duplicating parts have the identical indicating numerals, and corresponding parts are provided with a prime.

The electrical system shown in Fig. 9, is equally applicable to Figs. 10 and 11.

While I have herein shown and described only certain specific embodiments of my invention and have suggested only certain possible modifications, it will be appreciated that many changes and variations can be made to suit particular conditions and emobdiments of use, without departing from the spirit and scope of my invention.

What applicant claims as his invention:

1. In an automobile fore and aft adjustable front seat having a seat base and a tiltable backrest, backrest positions adjusting means comprising, an arm on said backrest, a hinged link on said arm having an operating portion engaged with means on said arm, reversible powerjack means operatively connecting the lower end of said operating portion and said base, a normally stationary cam on said base, a releasable latching means on the backrest normally connecting said arm and link for backrest power operation, said latching means being controlled by said cam in a predetermined position of the latching means to release the backrest for manual tilting thereof and accessible manual control means for actuating said powerjack means.

2. The invention disclosed in claim 1, wherein accessible dual manual control means are provided.

3. The invention disclosed in claim 1, wherein the normally stationary cam position is adjustable.

4. In a fore and aft adjustable front seat for an automobile having a base and a tiltable backrest having an arm, backrest power or selected manual tilting means comprising, reversible powerjack means including a releasable latch operatively connecting said arm to said base, whereby upon release of said latch the backrest is manually tiltable, and manual control means accessible to a front seat passenger for actuating said powerjack means.

5. The invention disclosed in claim 4, wherein manual control means accessible to the driver are included.

6. The invention disclosed in claim 4, wherein the release cam position is variable.

References Cited in the file of this patent

UNITED STATES PATENTS

| | | |
|---|---|---|
| 1,952,376 | Knabusch | Mar. 27, 1934 |
| 2,339,159 | Duncan | Jan. 11, 1944 |
| 2,526,248 | Luketa | Oct. 17, 1950 |
| 2,576,343 | Hibbard | Nov. 27, 1951 |

FOREIGN PATENTS

| | | |
|---|---|---|
| 367,105 | Italy | Jan. 16, 1939 |